United States Patent
Rausch et al.

(10) Patent No.: US 11,584,058 B2
(45) Date of Patent: Feb. 21, 2023

(54) METHOD AND DEVICE FOR THE PRODUCTION CONTROL OF AN EXTRUDED PLASTIC PRODUCT AND EXTRUSION SYSTEM FOR EXTRUDING SUCH A PLASTIC PRODUCT

(71) Applicant: DELFINGEN FR-ANTEUIL S.A., Anteuil (FR)

(72) Inventors: Hubert Rausch, Königsberg (DE); Tobias Thomamüller, Bruckmühl (DE)

(73) Assignee: DELFINGEN FR-ANTEUIL S.A., Anteuil (FR)

( * ) Notice: Subject to any disclaimer, the term of this patent is extended or adjusted under 35 U.S.C. 154(b) by 131 days.

(21) Appl. No.: 16/634,087

(22) PCT Filed: Jul. 17, 2018

(86) PCT No.: PCT/EP2018/069398
§ 371 (c)(1),
(2) Date: Jan. 24, 2020

(87) PCT Pub. No.: WO2019/020436
PCT Pub. Date: Jan. 31, 2019

(65) Prior Publication Data
US 2020/0238587 A1 Jul. 30, 2020

(30) Foreign Application Priority Data

Jul. 26, 2017 (DE) ............ 10 2017 116 955.5

(51) Int. Cl.
*B29C 49/00* (2006.01)
*B29C 48/92* (2019.01)
(Continued)

(52) U.S. Cl.
CPC .......... *B29C 49/0021* (2013.01); *B29C 48/09* (2019.02); *B29C 48/13* (2019.02);
(Continued)

(58) Field of Classification Search
CPC .......... B29C 48/92; B29C 2948/92209; B29C 2948/02152; B29C 2948/92428;
(Continued)

(56) References Cited

U.S. PATENT DOCUMENTS 3,372,920 A * 3/1968 Corbett ................ B29C 48/335
264/171.27
4,749,531 A 6/1988 Borger et al.
(Continued)

FOREIGN PATENT DOCUMENTS

DE 9218580 U1 9/1994
DE 102006012417 A1 9/2007
(Continued)

OTHER PUBLICATIONS

China National Intellectual Property Administration, Office Action and Search Report Issued in Application No. 201880062260.8, dated May 25, 2021, 24 pages.
(Continued)

*Primary Examiner* — Jeffrey M Wollschlager
(74) *Attorney, Agent, or Firm* — Alleman Hall Creasman & Tuttle LLP

(57) ABSTRACT

A method for the production control of an extruded plastic product with the following steps: recording at a first measuring point a first actual temperature of a measuring area provided on the plastic product, recording a second actual temperature of the measuring area at a second measuring point which is arranged at a distance from the first measuring point in a direction of extrusion of the plastic product, determining a setpoint temperature of the measuring area at the second measuring point, and outputting information on whether the second actual temperature is inside or outside a prescribed tolerance range of the setpoint temperature.

8 Claims, 9 Drawing Sheets

(51) Int. Cl.
    *B29C 48/09*     (2019.01)
    *B29C 48/13*     (2019.01)
    *B29C 48/88*     (2019.01)
    *B29D 23/18*     (2006.01)
    *B29C 48/30*     (2019.01)

(52) U.S. Cl.
    CPC ........ *B29C 48/303* (2019.02); *B29C 48/9115* (2019.02); *B29C 48/92* (2019.02); *B29C 49/0015* (2013.01); *B29D 23/18* (2013.01); *B29C 2948/92209* (2019.02); *B29C 2948/92447* (2019.02); *B29C 2948/92647* (2019.02); *B29C 2948/92704* (2019.02)

(58) Field of Classification Search
    CPC ........... B29C 2948/92438; B29C 2948/92447; B29C 2948/92647; B29C 2948/92704; B29C 43/226; B29C 48/13; B29C 49/0015; B29C 49/0021; B29C 49/0026; B29C 53/30; B29C 53/305
    See application file for complete search history.

(56) References Cited

U.S. PATENT DOCUMENTS

| | | | | |
|---|---|---|---|---|
| 5,288,441 | A * | 2/1994 | Collins | B29C 48/913 |
| | | | | 425/141 |
| 11,141,904 | B2 * | 10/2021 | Schmitz | B29C 48/912 |
| 2005/0080507 | A1 * | 4/2005 | Silberg | B29C 48/2694 |
| | | | | 700/196 |
| 2009/0032986 | A1 * | 2/2009 | Fujita | B29C 48/9155 |
| | | | | 264/1.6 |
| 2010/0109185 | A1 * | 5/2010 | Ogawa | B29C 48/914 |
| | | | | 425/112 |
| 2013/0223476 | A1 * | 8/2013 | Sikora | B29C 48/07 |
| | | | | 374/100 |
| 2019/0232543 | A1 * | 8/2019 | Schmitz | B29C 41/26 |
| 2020/0189167 | A1 * | 6/2020 | Backman | G05B 19/41875 |

FOREIGN PATENT DOCUMENTS

| | | |
|---|---|---|
| DE | 102010027818 A1 | 10/2011 |
| DE | 102016119872 A1 | 12/2016 |
| EP | 0287551 A1 | 10/1988 |
| EP | 0592974 A2 | 4/1994 |
| EP | 1616687 A1 | 1/2006 |
| JP | 2006056215 A | 3/2006 |
| JP | 2006056216 A | 3/2006 |
| JP | 2007216481 A | 8/2007 |
| JP | 2008246866 A | 10/2008 |
| WO | 0010794 A1 | 3/2000 |

OTHER PUBLICATIONS

China National Intellectual Property Administration, Office Action and Search Report Issued in Application No. 201880062260.8, dated Jun. 21, 2022, 22 pages.

China National Intellectual Property Administration, Office Action and Search Report Issued in Application No. 201880062260.8, dated Feb. 8, 2022, 30 pages.

Hansen, F., "Plastics Extrusion Technology," 2nd Edition, Light Industry Press, Jan. 2001, 5 pages. (See Chinese Office Action Issued in Application No. 201880062260.8 for Explanation of Relevance.).

* cited by examiner

METHOD AND DEVICE FOR THE PRODUCTION CONTROL OF AN EXTRUDED PLASTIC PRODUCT AND EXTRUSION SYSTEM FOR EXTRUDING SUCH A PLASTIC PRODUCT

FIELD

The present invention relates to a method for the production control of an extruded plastic product, a device for the production control of such an extruded plastic product, and an extrusion system with such a device for extruding such a plastic product.

BACKGROUND

Corrugated tubes or corrugated pipes can in particular be used in automotive engineering as protective conduits for cables, such as electrical lines. Such corrugated tubes comprise alternately arranged wave crests and wave valleys. These wave crests and wave valleys are molded onto the corrugated tube by means of a so-called corrugator after extrusion of a plastic material. To this end, the corrugator comprises mold jaws which are arranged in pairs and which continuously rotate on tracks. For quality control or production control, in particular for wall thickness control, of the corrugated tube, random samples of the corrugated tube can be taken and analyzed after the corrugator.

SUMMARY

With this as the background, an object of the present invention consists in providing an improved method for production control.

Accordingly, a method for the production control of an extruded plastic product is proposed. The method comprises the following steps: recording at a first measuring point a first actual temperature of a measuring area provided on the plastic product, recording a second actual temperature of the measuring area at a second measuring point which is arranged at a distance from the first measuring point in a direction of extrusion of the plastic product, determining a setpoint temperature of the measuring area at the second measuring point, and outputting information on whether the second actual temperature is inside or outside a prescribed tolerance range of the setpoint temperature.

Because the first actual temperature and the second actual temperature can be monitored continuously and the second actual temperature can be compared to the setpoint temperature, a 100% production control is possible in the operation of an extrusion system for the production of the plastic product. Deviations of the second actual temperature from the setpoint temperature indicate a change in the wall thickness of the plastic product. By readjusting the extrusion system, these changes in the wall thickness can be kept within a tolerance range of a nominal wall thickness. Continuous wall thickness monitoring, in particular inline wall thickness monitoring, is thus possible. Time-consuming taking of samples can be dispensed with. The operation of the extrusion system can continue during the production control without interruption. Changes in the actual temperatures can be logged continuously.

Determining the setpoint temperature of the measuring area at the second measuring point can include calculating the same based on the first actual temperature. That is to say, in a preferred development of the method, the method comprises the following steps: recording at a first measuring point a first actual temperature of a measuring area provided on the plastic product, recording a second actual temperature of the measuring area at a second measuring point which is arranged at a distance from the first measuring point in a direction of extrusion of the plastic product, calculating a setpoint temperature of the measuring area at the second measuring point based on the first actual temperature, and outputting information on whether the second actual temperature is inside or outside a prescribed tolerance range of the setpoint temperature.

Alternatively, determining the setpoint temperature can also take place in that the setpoint temperature is determined based on a production trial used as reference. In this case, the setpoint temperature of the measuring area at the second measuring point is preferably not calculated. That is to say, the second actual temperature of the measuring area at the second measuring point is in particular not compared to calculated values of the setpoint temperature but to values of the setpoint temperature actually ascertained during a sample production.

The plastic product is preferably a corrugated tube or corrugated pipe or can be referred to as corrugated tube or as corrugated pipe. The method can however also be used for smooth tubes or smooth pipes. The method can moreover be used for plastic products with any cross-section, for example, with an L-shaped or I-shaped cross-section. Any number of measuring points can be provided, at which any number of actual temperatures can be ascertained. However, at least the first measuring point and the second measuring point are preferably provided. The plastic product is preferably a continuous product that can be cut to a desired length. The method is in particular carried out at or with an extrusion system. The method can also comprise a step of manufacturing, in particular extruding, of the plastic product. In this case, the method is in particular a method for extruding the plastic product.

The recording of the second actual temperature and the determining, in particular the calculating, of the setpoint temperature can take place simultaneously or successively. In doing so, the calculating of the setpoint temperature can in particular be carried out before or during or after the recording of the second actual temperature. The information output can, for example, be output by means of a screen or display so that operating personnel can react immediately to deviations of the second actual temperature from the tolerance range of the setpoint temperature. The information can also be used to automatically adjust and/or regulate system parameters of the extrusion system so that the second actual temperature is always kept within the prescribed tolerance range of the setpoint temperature in the operation of the extrusion system. During the method, i.e., in the operation of the extrusion system, the measuring area is conveyed or transported in the direction of extrusion from the first measuring point to the second measuring point.

Based on the first actual temperature and the second setpoint temperature, conclusions about a wall thickness of the plastic product can be drawn. Based on a determined deviation of the second actual temperature from the calculated setpoint temperature, conclusions about changes in the wall thickness or deviations of the wall thickness can furthermore be drawn. That is to say, the method is suitable for continuously monitoring the wall thickness of the plastic product in the operation of the extrusion system and for readjusting it as appropriate in case of deviations of the wall thickness.

The first measuring point and the second measuring point are preferably fixed with respect to the direction of extrusion, wherein the second measuring point is arranged downstream of the first measuring point with respect to the direction of extrusion. The first measuring point and the second measuring point can be spaced apart a few centimeters to several meters. The direction of extrusion is defined as a direction in which the extrusion system conveys the plastic product. The direction of extrusion is preferably oriented in parallel to an axis of symmetry of the plastic product. The direction of extrusion can also be called machine direction or production direction.

According to one embodiment, the setpoint temperature is calculated based on the first actual temperature by means of a cooling curve of the plastic product.

Alternatively, the setpoint temperature can also be determined based on a calibration process in particular during a production trial as mentioned above. The cooling curve can also be determined based on the production trial. The cooling curve can also be called cooling-down curve or fading curve. By means of the cooling curve, it can be determined which temperature the measuring area calculationally has at a defined distance from the first measuring point, in particular at the second measuring point. The cooling curve is, for example, calculated based on material parameters of the plastic material used and/or system parameters of the extrusion system, such as a rotational speed of an extruder and/or of a melt pump of the extrusion system, a haul-off speed of the plastic product, a temperature of heating cartridges of a die head, or the like. A computing device can be provided for this purpose. The computing device can, for example, be a personal computer or an industrial computer. The computing device is in particular operatively connected to the output device. The output device may be part of the computing device.

According to a further embodiment, the first actual temperature is recorded at the first measuring point in the direction of extrusion after a corrugator of an extrusion system.

As a result, the plastic product can be continuously monitored after molding wave crests and wave valleys thereon. The corrugator is optional. The first measuring point can alternatively also be arranged after an extraction device for extracting the plastic product. In this case, the plastic product can, for example, be a smooth tube, a smooth pipe, or the like.

According to a further embodiment, the first actual temperature and the second actual temperature are recorded by means of a recording device operating without contact.

The recording device can comprise one or more recording elements operating without contact. The recording elements can respectively be designed as infrared cameras or can respectively comprise an infrared camera. In this case, the first actual temperature and the second actual temperature can be monitored with only one recording element if the recording element has a sufficiently large detection area, i.e., if the first measuring point and the second measuring point are not spaced too far apart. In one embodiment of a recording element as infrared camera with a wide-angle lens, the first measuring point and the second measuring point can, for example, also be just a part of an infrared image.

According to a further embodiment, a wall thickness of the plastic product is calculated by means of the first actual temperature and/or the second actual temperature.

The wall thickness can, for example, be calculated based on the respective actual temperature, material parameters of the plastic material used, and system parameters of the extrusion system. In this case, a defined wall thickness is assigned to each actual temperature. In this respect, both a wall thickness of the plastic product at the wave valleys, at the wave crests, or at the flanks of the wave crests and wave valleys can be ascertained. This makes comprehensive monitoring of the plastic product possible.

According to a further embodiment, the information that an actual wall thickness of the plastic product at the measuring area exceeds a prescribed nominal wall thickness of the plastic product at the measuring area is output in the case that the second actual temperature is outside and above the tolerance range of the setpoint temperature.

The tolerance range is defined by means of a lower or first tolerance curve and an upper or second tolerance curve. The cooling curve is in particular located between the two tolerance curves. In the case that the second actual temperature is outside and above the tolerance range of the setpoint temperature, i.e., above the second tolerance curve, the output device in particular outputs the information that the actual wall thickness of the plastic product exceeds the prescribed nominal wall thickness and in particular a tolerance range of the nominal wall thickness. That is to say, if the second actual temperature is significantly above the calculated setpoint temperature at the second measuring point, it is in particular to be assumed that a material accumulation that cools down more slowly than determined or calculated by means of the cooling curve exists on the plastic product, in particular at the measuring area. The extrusion system can then be controlled and/or readjusted by means of a control and/or regulating device thereof based on the information in such a way that the second actual temperature or the actual wall thickness is again within the tolerance range of the setpoint temperature or within the tolerance range of the nominal wall thickness.

According to a further embodiment, the information that the actual wall thickness at the measuring area falls below a prescribed nominal wall thickness at the measuring area is output in the case that the second actual temperature is outside and below the tolerance range of the setpoint temperature.

In the case that the second actual temperature is outside and below the tolerance range of the setpoint temperature, the output device in particular outputs the information that the actual wall thickness falls below the nominal wall thickness and in particular the tolerance range of the nominal wall thickness. That is to say, if the second actual temperature at the second measuring area is significantly below the calculated setpoint temperature, it can be assumed that a material thinning exists, which leads to the plastic product at the measuring area cooling down more quickly than determined or calculated by means of the cooling curve. As already stated, the extrusion system can then be controlled and/or readjusted by means of the control and/or regulating device based on the information in such a way that the second actual temperature or the actual wall thickness is again within the tolerance range of the setpoint temperature or within the tolerance range of the nominal wall thickness.

According to a further embodiment, an extrusion system for extruding the plastic product is readjusted in such a way that the actual wall thickness at the measuring area is always within a prescribed tolerance range of the nominal wall thickness.

The tolerance range can, for example, comprise fractions of 1/10 (one tenth) millimeters to a few 1/10 millimeters. For example, on a die head of the extrusion system can be provided control elements that make it possible to automatically center a mandrel of the die head in relation to a mouthpiece of the die head so that the prescribed tolerance range of the nominal wall thickness is always maintained all around the plastic product.

According to a further embodiment, the first actual temperature and/or the second actual temperature are recorded at several measuring areas provided on the plastic product, wherein the measuring areas are arranged and distributed evenly around the plastic product.

The number of measuring areas is arbitrary. Preferably at least three, particularly preferably four, measuring areas are provided, which are positioned, for example, at a 90° offset to each other. Alternatively, a single annular measuring area circumferential to the plastic product may also be provided.

Furthermore, a device for the production control of an extruded plastic product is proposed. The device comprises a recording device for recording at a first measuring point a first actual temperature of a measuring area provided on the plastic product and for recording a second actual temperature of the measuring area at a second measuring point which is arranged at a distance from the first measuring point in a direction of extrusion of the plastic product, a computing device for determining a setpoint temperature of the measuring area at the second measuring point, and an output device for outputting information on whether the second actual temperature is inside or outside a prescribed tolerance range of the setpoint temperature.

As already mentioned, determining the setpoint temperature of the measuring area at the second measuring point can include calculating the same based on the first actual temperature. That is to say, in a preferred development of the device, the device comprises a recording device for recording at a first measuring point a first actual temperature of a measuring area provided on the plastic product and for recording a second actual temperature of the measuring area at a second measuring point which is arranged at a distance from the first measuring point in a direction of extrusion of the plastic product, a computing device for calculating a setpoint temperature of the measuring area at the second measuring point based on the first actual temperature, and an output device for outputting information on whether the second actual temperature is inside or outside a prescribed tolerance range of the setpoint temperature.

As already mentioned, determining the setpoint temperature can alternatively also take place in that the setpoint temperature is determined based on a production trial used as reference. In this case, the setpoint temperature of the measuring areas at the second measuring point is preferably not calculated by means of the computing device. In this case, the computing device does not calculate the setpoint temperature TS but stores the values ascertained during the sample production in order to compare them then in particular to the second actual temperature. The computing device can also be referred to as computer device or storage device or be designed as such.

By means of the device, in particular the previously described method is carried out. The device may be part of the extrusion system for extruding the plastic product. As previously mentioned, the recording device may comprise at least one or more recording elements in the form of infrared cameras. The computing device may be a personal computer or an industrial computer or may comprise such a computer. The output device may be a screen or a display. The output device may also be a warning lamp or a data carrier. The output device may be part of the computing device. The computing device and/or the output device may be coupled to the control and/or regulating device of the extrusion system in order to control and/or readjust the extrusion system as a function of the information output by the output device.

According to one embodiment, the recording device comprises a first recording element operating without contact, in particular a first infrared camera, for recording the first actual temperature, and a second recording element operating without contact, in particular a second infrared camera, for recording the second actual temperature.

The second recording element is optional. Alternatively, both the first actual temperature and the second actual temperature can be recorded using the first recording element. As a result, the device can be designed particularly cost-effectively.

According to a further embodiment, the recording device comprises several first recording elements which are arranged and distributed evenly around the plastic product, and/or several second recording elements which are arranged and distributed evenly around the plastic product.

The number of recording elements is arbitrary. For example, three or four first recording elements and/or three or four second recording elements are provided. The recording elements are respectively arranged and distributed evenly around a circumference of the plastic product. In this case, the recording elements may be arranged in such a way that the recording elements are aligned orthogonally to the axis of symmetry of the plastic product. As a result, in particular the wave crests and wave valleys of the plastic product can be recorded. Alternatively, the recording elements may also be arranged at an angle of inclination obliquely to the axis of symmetry. As a result, the flanks of the plastic product, in particular the flanks of the wave crests, can also be recorded. In addition, some recording elements may also be arranged orthogonally and some recording elements obliquely to the axis of symmetry. This makes comprehensive monitoring of the plastic product possible. The flanks of the wave crests may also be recorded by means of a wide-angle lens in a suitable design of a recording element as infrared camera. As a result, the "image sequence" of the plastic product first shows a flank oriented against the direction of extrusion and in the further course a second flank located in the direction of extrusion.

Furthermore proposed is an extrusion system for extruding a plastic product. The extrusion system comprises an extruder and such a device arranged downstream of the extruder in the direction of extrusion.

The device is in particular arranged downstream of the extruder in the direction of extrusion. In addition to the extruder, the extrusion system may also comprise an optional melt pump. The extruder may be a single-screw extruder or a twin-screw extruder. The extrusion system may also comprise more than one extruder. In this case, the extrusion system is designed as a multi-component extrusion system. The extrusion system may however also be a single-component extrusion system and then comprises only one extruder.

According to one embodiment, the extrusion system furthermore comprises a corrugator arranged between the extruder and the device.

The corrugator is optional. In the case that a corrugator is not provided, the plastic product is preferably a smooth tube or a smooth pipe. The corrugator comprises a plurality of mold jaws for molding the wave valleys and wave crests onto the plastic product. The mold jaws are guided in pairs along tracks in order to give the plastic product the desired shape.

According to a further embodiment, the extrusion system furthermore comprises a control and/or regulating device, which readjusts the extrusion system as a function of the information output by the output device in such a way that the second actual temperature is always within the prescribed tolerance range of the setpoint temperature in the operation of the extrusion system.

That is to also say in particular that the actual wall thickness of the plastic product can be adjusted by means of the control and/or regulating device in such a way that the actual wall thickness is always within the tolerance range of the nominal wall thickness. The computing direction and/or the output device of the device may be part of the control and/or regulating device or be operatively connected thereto. For readjusting the extrusion system, the control and/or regulating device comprises, for example, the aforementioned control elements which are designed to adjust the die head of the extrusion system in such a way that the second actual temperature is always within the prescribed tolerance range of the setpoint temperature or the actual wall thickness is always within the tolerance range of the nominal wall thickness.

Additional possible implementations of the method, the device, and/or the extrusion system also include not explicitly mentioned combinations of features or embodiments described above or below with respect to the exemplary embodiments. In this respect, the person skilled in the art will also add individual aspects as improvements or additions to the respective basic form of the method, the device, and/or the extrusion system.

Additional advantageous embodiments and aspects of the method, the device, and/or the extrusion system are the subject matter of the dependent claims and of the exemplary embodiments of the method, the device, and/or the extrusion system described below. The method, the device, and/or the extrusion system are explained in more detail below based on preferred embodiments with reference to the appended figures.

DETAILED DESCRIPTION

Unless otherwise indicated, identical or functionally identical elements are provided with the same reference signs in the figures.

Figure 1:
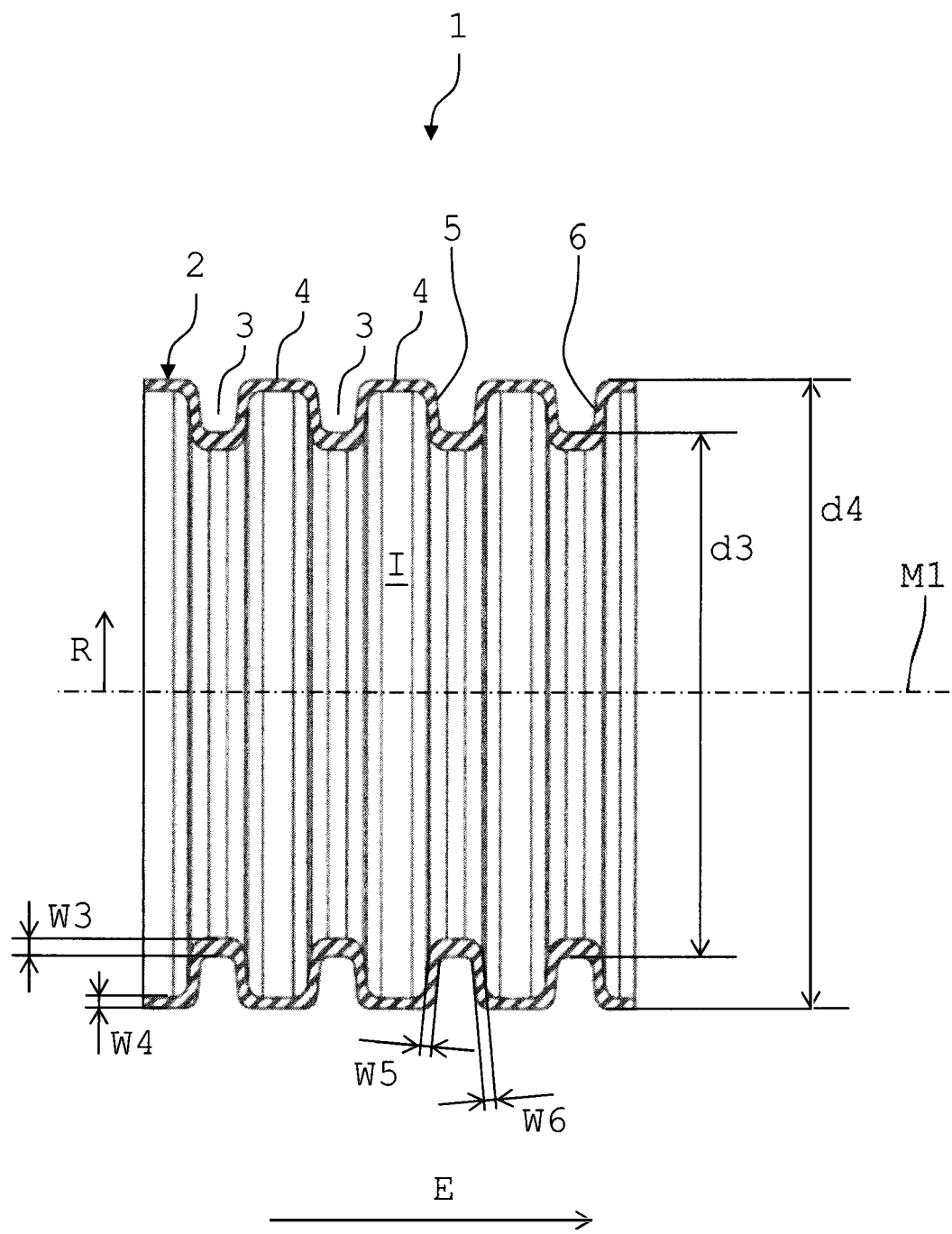
FIG. 1 shows a schematic sectional view of an embodiment of a plastic product.

FIG. 1 shows a schematic sectional view of an embodiment of a pipe-shaped or tube-shaped plastic product 1 produced by means of an extrusion method. The plastic product 1 is in particular a corrugated tube or corrugated pipe or may also be called a corrugated tube or corrugated pipe.

The plastic product 1 is preferably a continuous product which can be cut to a desired length, for example sawed off or cut off. The plastic product 1 is produced from a thermoplastically processable plastic material, such as a polyethylene (PE), a polypropylene (PP), an acrylonitrile butadiene styrene (ABS), or the like. The plastic product 1 may be produced from only one component, i.e., from only one plastic material, or from several components, i.e., from several different plastic materials.

The plastic product 1 may be designed to be rotation-symmetrical with respect to a center axis or axis of symmetry M1. During its production, the plastic product 1 is extruded in a direction of extrusion E by means of an extrusion system. In this case, the direction of extrusion E may be oriented in the orientation of FIG. 1 from left to right or from right to left. The direction of extrusion E is oriented in parallel to the axis of symmetry M1. The direction of extrusion E may also be called production direction or machine direction.

The plastic product 1 also has a radial direction R, which is oriented away from the axis of symmetry M1. The radial direction R is positioned orthogonally to the axis of symmetry M1. The radial direction R is in particular oriented away from the axis of symmetry M1 toward a wall 2 of the plastic product 1.

The plastic product 1 or the wall 2 comprises wave valleys 3 and wave crests 4, which alternate in the direction of extrusion E and of which only two each are provided with a reference sign in FIG. 1. The wave valleys 3 and wave crests 4 are arranged in such a way that one wave crest 4 is respectively arranged between two wave valleys 3 and one wave valley 3 is respectively arranged between two wave crests 4. The wave valleys 3 and the wave crests 4 are provided on the plastic product 1 both on the outside and on the inside, i.e., facing an internal space I of the plastic product 1.

For example, the wave valleys 3 and the wave crests 4 can be molded, after extrusion of the plastic product 1, onto the plastic product 1 or onto the wall 2 by means of a so-called corrugator. The plastic product 1 has an inner diameter d3 at each wave valley 3 and an outer diameter d4 at each wave crest 4. The outer diameter d4 is larger than the inner diameter d3.

At the wave valleys 3, the wall 2 has a wall thickness W3, and at the wave crests 4, the wall 2 has a wall thickness W4. The wall thicknesses W3, W4 can be different or equal. The wave valleys 3 are connected to the wave crests 4 by means of flanks 5, 6. That is to say, on both sides of each wave valley 3 or on both sides of each wave crest 4, a flank 5, 6 is provided in each case. In this case, the flanks 5, 6 are arranged to face each other. A respective first flank 5 has a wall thickness W5 and a respective second flank 6 has a wall thickness W6. The wall thicknesses W5, W6 are preferably equal. The magnitude of the wall thicknesses W5, W6 may differ from or be equal to that of the wall thicknesses W3, W4.

Figure 2:
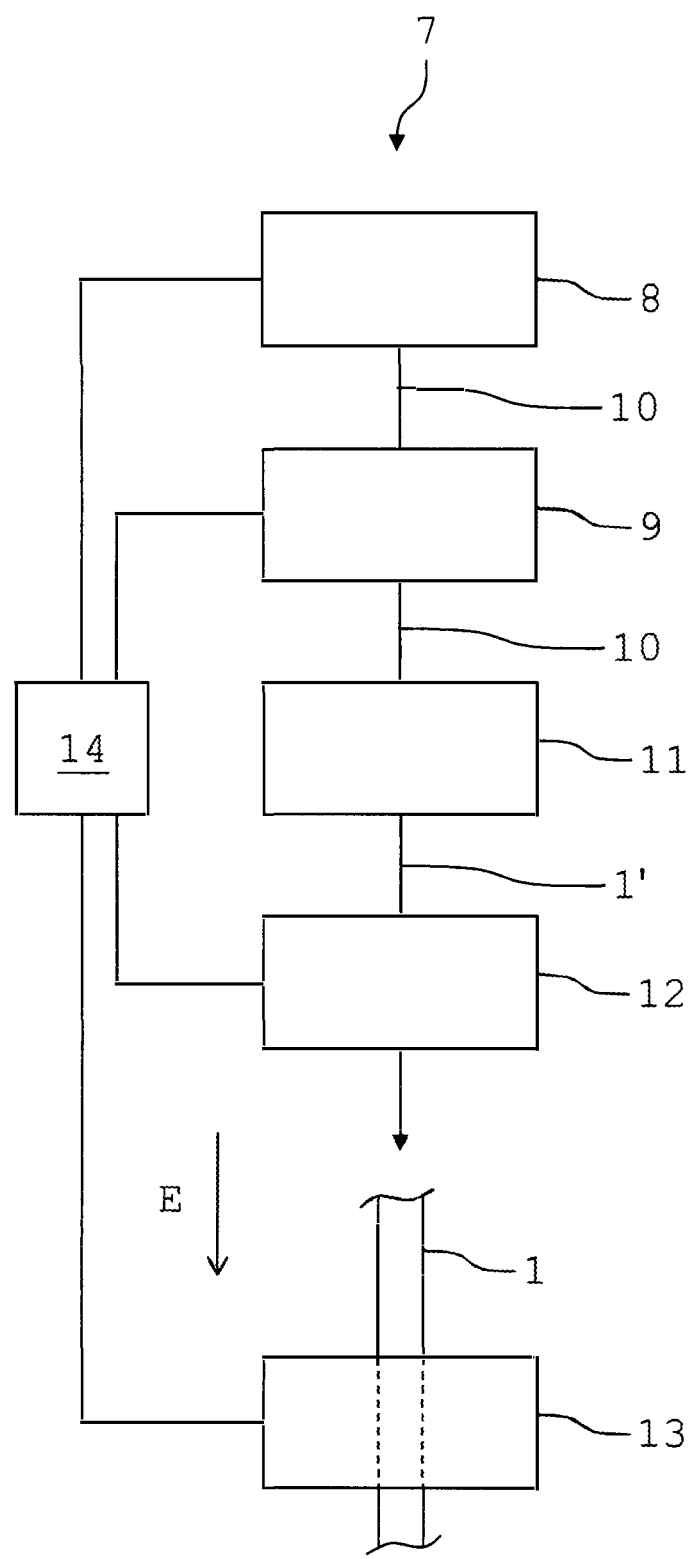
FIG. 2 shows a schematic view of an embodiment of an extrusion system for extruding the plastic product according to FIG. 1.

FIG. 2 shows a schematic view of an embodiment of an extrusion system 7 for producing the plastic product 1 described above. The extrusion system 7 comprises an extruder 8 designed to plasticize a plastic material and to supply it to a melt pump 9. The plasticized plastic material is supplied to the melt pump 9 as melt flow 10. The extruder 8 may, for example, be a single-screw extruder or a twin-screw extruder. The melt pump 9 is optional. The melt pump 9 can reduce pulsations and irregular transports of the melted plastic material. The melt pump 9 supplies the melt flow 10 to a die head 11 of the extrusion system 7.

The extrusion system 7 is preferably a one-component extrusion system. Alternatively, the extrusion system 7 may also be a multi-component extrusion system. In this case, the extrusion system 7 may comprise several extruders 8 and several melt pumps 9, wherein different melt flows are then merged in the die head 11 in order to form the plastic product 1.

Provided downstream of the die head 11 in the direction of extrusion E is a corrugator 12. By means of the corrugator 12, the wave valleys 3 and wave crests 4 can be molded onto a blank 1' of the plastic product 1. The blank 1' is a smooth pipe or smooth tube or may also be called smooth pipe or smooth tube. The corrugator 12 may comprise a plurality of rotating mold jaws for molding-on the wave valleys 3 and the wave crests 4. The corrugator 12 is optional. In the case that the plastic product 1 is a smooth tube or smooth pipe, i.e., in the case that the plastic product 1 does not comprise any wave valleys 3 and wave crests 4, the corrugator 12 can be dispensed with. By means of the extrusion system 7, the plastic product 1 is produced as a continuous product and can be cut to a desired length, e.g., cut off or sawed off, after the corrugator 12.

The extrusion system 7 furthermore comprises a device 13 for production control. As viewed in the direction of extrusion E, the device 13 is positioned after the corrugator 12. The plastic product 1 with the molded-on wave valleys 3 and wave crests 4 passes through the device 13. By means of the device 13, a 100% quality control of the plastic product 1 can be carried out as is explained below.

The extrusion system 7 furthermore comprises a control and/or regulating device 14 which may be operatively connected to the extruder 8, the melt pump 9, the die head 11, the corrugator 12, and/or the device 13. By means of the control and/or regulating device 14, production parameters or system parameters of the extrusion system 7 can be adjusted and/or regulated. For example, a rotational speed of a screw of the extruder 8, a pump rotational speed of the melt pump 9, a temperature adjustment of the die head 11, and/or a haul-off speed of the corrugator 12 can be adjusted and/or regulated by means of the control and/or regulating device 14.

Figure 3:
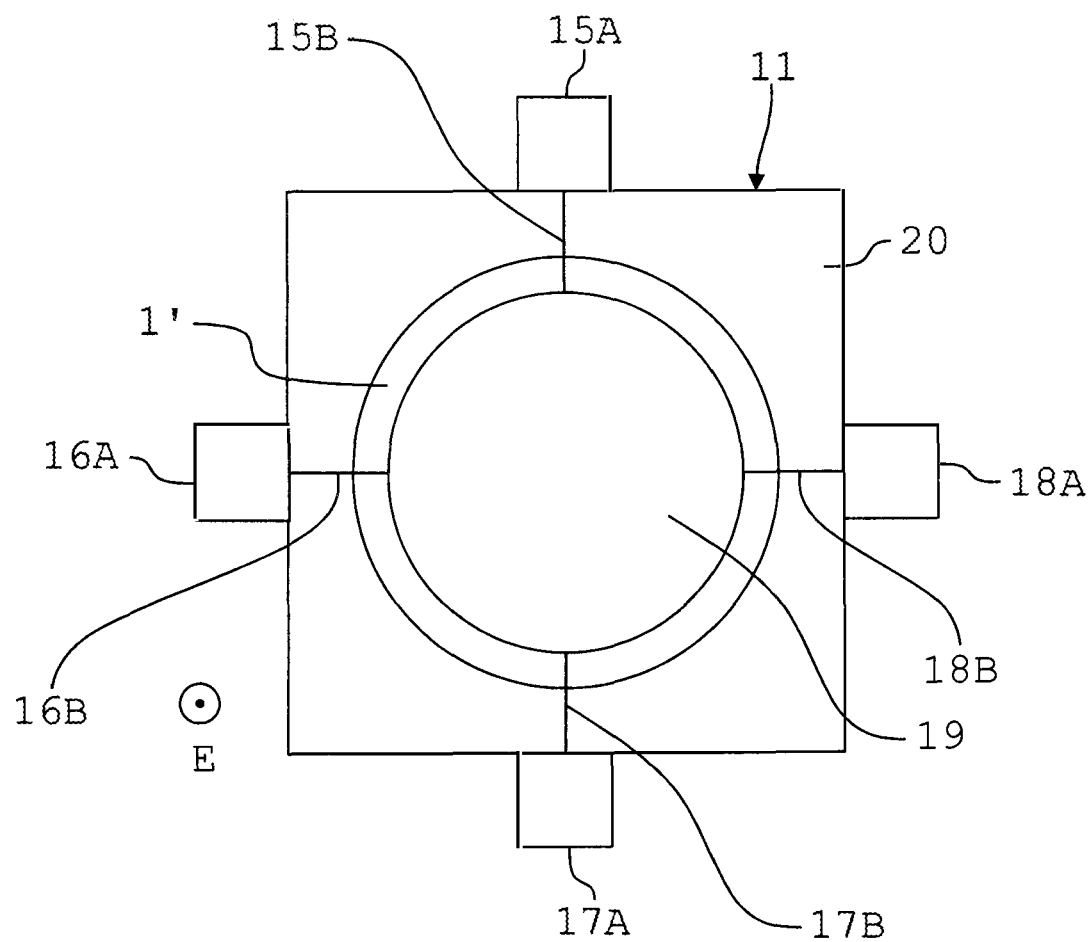
FIG. 3 shows a schematic front view of an embodiment of a die head for the extrusion system according to FIG. 2.

By means of the control and/or regulating device 14, control elements 15A to 18A of the die head 11 can furthermore be controlled as shown in FIG. 3 in such a way that a mandrel 19 of the die head 11 can be positioned in relation to a mouthpiece 20 of the same and can in particular be centered in relation thereto. Provided to this end are, for example, four control elements 15A to 18A which may be designed as electric motors. The control elements 15A to 18A are respectively arranged at a 90° offset to each other. The control elements 15A to 18A can in particular be coupled to the mandrel 19 by means of coupling elements 15B to 18B, e.g., by means of threaded spindles. By means of the control elements 15A to 18A, the mandrel 19 can then be positioned in an x direction x and a y direction y in relation to the mouthpiece 20.

Figure 4:
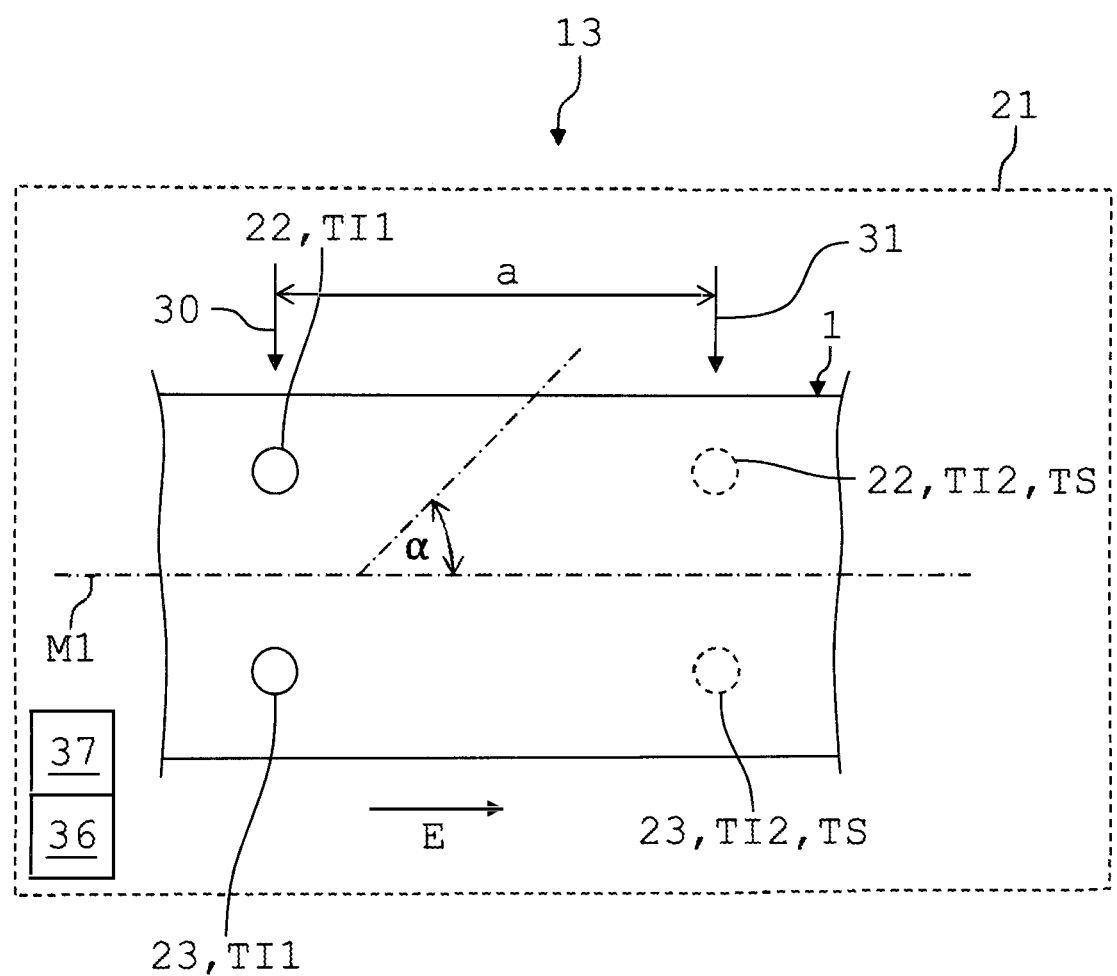
FIG. 4 shows a schematic side view of an embodiment of a device for the production control for the extrusion system according to FIG. 2.
Figure 5:
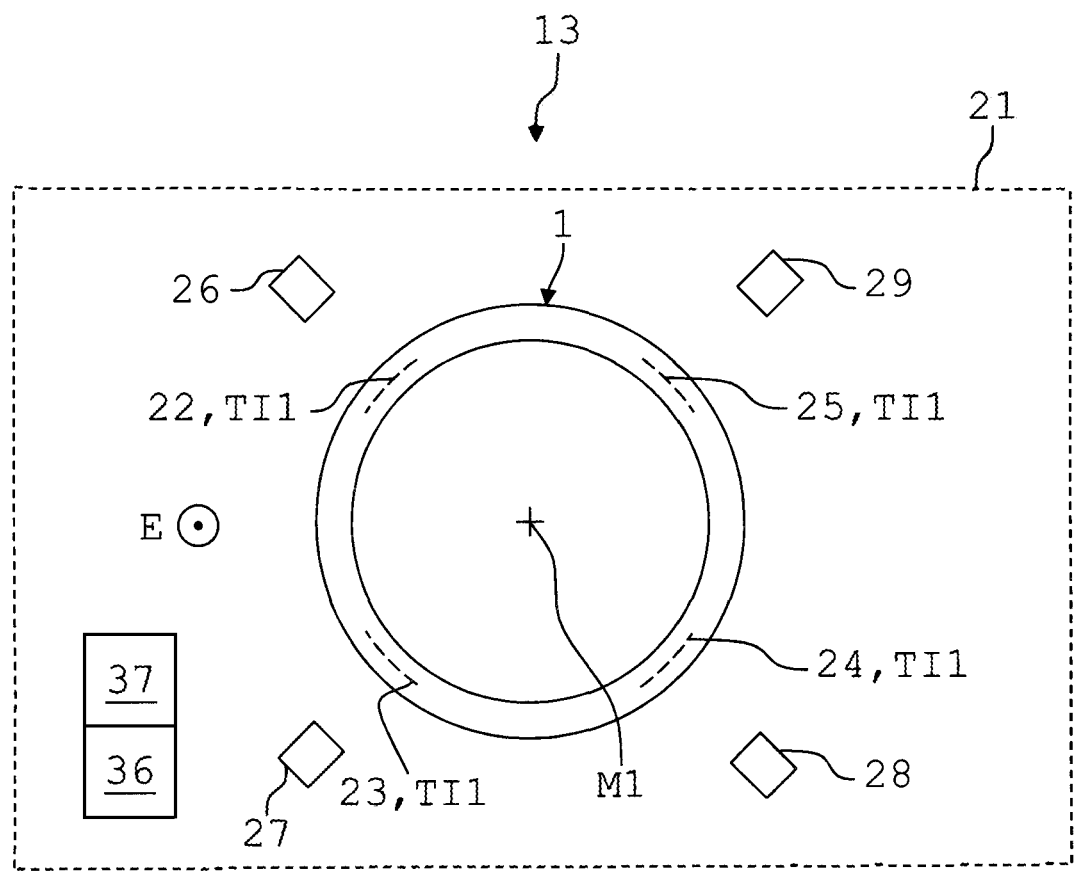
FIG. 5 shows a sectional view of the device according to FIG. 4 at a first measuring point.
Figure 6:
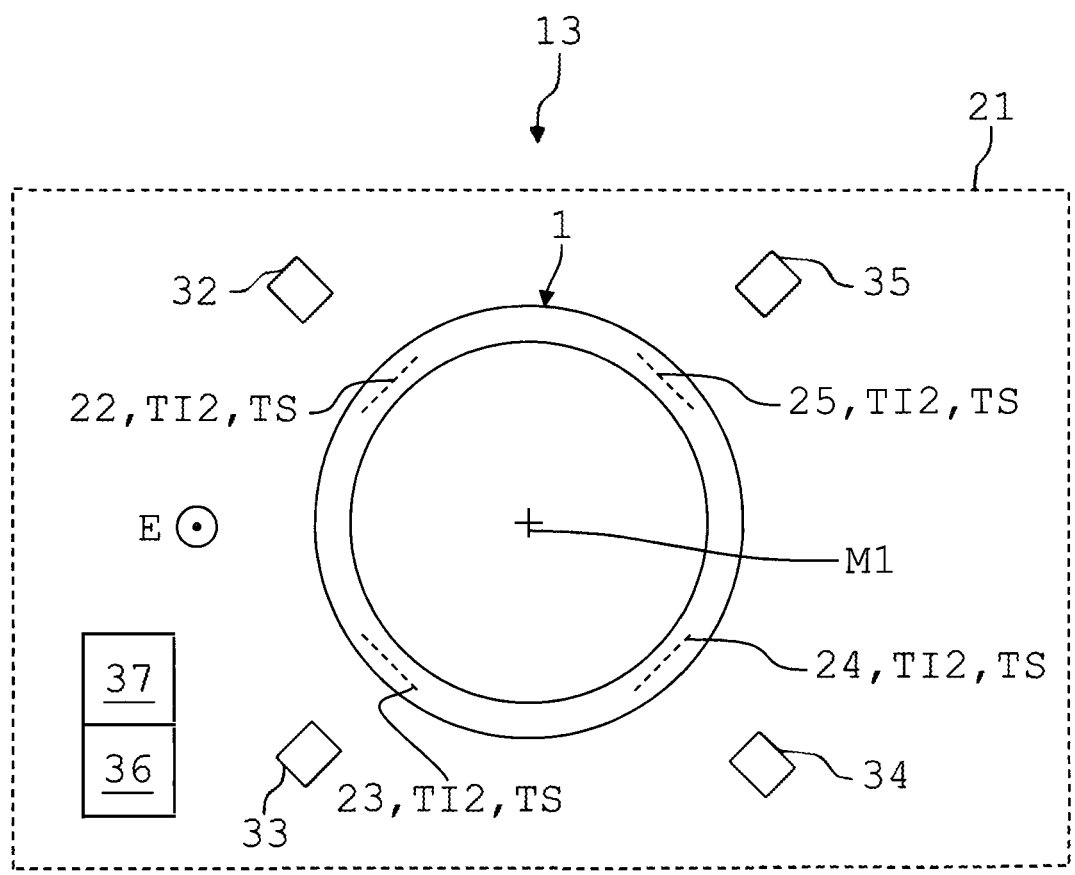
FIG. 6 shows another sectional view of the device according to FIG. 4 at a second measuring point.

The device 13 comprises a recording device 21, shown in FIGS. 4 to 6, for recording a first actual temperature TI1 of a measuring area 22 provided on the plastic product 1. The measuring area 22 may, for example, be a measuring point or measuring surface provided on the plastic product 1. The measuring area 22 may also be annularly circumferential to the plastic product 1. Also provided may be several measuring areas 22 to 25 (FIG. 5, FIG. 6), which are arranged and distributed evenly around a circumference of the plastic product 1.

For example, the measuring areas 22 to 25 may respectively be positioned at a 90° offset to each other. In order to record the first actual temperature TI1 at the measuring areas 22 to 25, the recording device 21 may comprise several, e.g., four, first recording elements 26 to 29 operating without contact (FIG. 5). The first recording elements 26 to 29 can, for example, respectively be designed as infrared cameras or can respectively comprise an infrared camera. An infrared camera or thermal imaging camera is presently an imaging device that receives infrared radiation. The received infrared radiation is preferably in the wavelength range of approximately 0.7 µm to 1000 µm.

The first actual temperature TI1 is recorded at a first measuring point 30 fixed with respect to the direction of extrusion E. FIG. 5 shows a sectional view of the recording device 21 at the first measuring point 30. A second actual temperature TI2 of the measuring areas 22 to 25 is furthermore recorded in the operation of the extrusion system 7 at a second measuring point 31 which is arranged at a distance from the first measuring point 30 in the direction of extrusion E. FIG. 6 shows a sectional view of the recording device 21 at the second measuring point 31. A distance a between the first measuring point 30 and the second measuring point 31 can be a few centimeters to several meters.

During production of the plastic product 1, the measuring areas 22 to 25 are then transported from the first measuring point 30 to the second measuring point 31. At the second measuring point 31, the second actual temperature TI2 is recorded by means of the recording device 21. In order to be able to record the second actual temperature TI2 as shown in FIG. 6, second recording elements 32 to 35 are provided, which, like the first recording elements 26 to 29, are preferably arranged and distributed evenly around a circumference of the plastic product 1. The second recording elements 32 to 35 can also respectively be designed as infrared cameras or can also respectively comprise an infrared camera. The second recording elements 32 to 35 are optional.

Alternatively to the second recording elements 32 to 35, the second actual temperature TI2 can also be additionally ascertained at the second measuring point 31 by means of the first recording elements 26 to 29 if the first recording elements 26 to 29 have a correspondingly large image section. The first recording elements 26 to 29 or at least a portion of the first recording elements 26 to 29 and/or the second recording elements 32 to 35 or at least a portion of the second recording elements 32 to 35 may be orthogonal to the axis of symmetry M1 or be inclined in relation thereto at an angle of inclination α (FIG. 4). As a result, both the wave valleys 3 and the wave crests 4 as well as the flanks 5, 6 of the wall 2 of the plastic product 1 can be recorded by means of the recording device 21.

The device 13 furthermore comprises a computing device 36. The computing device 36 may be part of the control and/or regulating device 14 or be coupled thereto. The computing device 36 may, for example, be a personal computer or an industrial computer or may comprise such a computer. By means of the computing device 36, a setpoint temperature TS (FIG. 4, FIG. 6) of the measuring areas 22 to 25 is to be determined at the second measuring point 31. By means of the computing device 36, the setpoint temperature TS of the measuring areas 22 to 25 at the second measuring point 31 can in particular be calculated based on the first actual temperature TI1 recorded at the first measuring point 30. That is to say, determining the setpoint temperature TS of the measuring areas 22 to 25 at the second measuring point 31 includes a calculation of the same.

Alternatively, determining the setpoint temperature TS of the measuring areas 22 to 25 at the second measuring point 31 can also take place in that the setpoint temperature TS is determined based on a production trial used as reference. In this case, the setpoint temperature TS of the measuring areas 22 to 25 at the second measuring point 31 is not calculated. That is to say, the second actual temperature TI2 of the measuring areas 22 to 25 at the second measuring point 31 is not compared to calculated values of the setpoint temperature TS but to values of the setpoint temperature TS actually ascertained during a sample production. In this case, the computing device 36 does not calculate the setpoint temperature TS but stores the values of the setpoint temperature TS ascertained during the sample production.

The calculation of the setpoint temperature TS takes place, for example, based on material parameters of the plastic material used, system parameters of the extrusion system 7, such as a rotational speed or conveying speed of the extruder 8 and/or of the melt pump 9, a temperature at the die head 11, and/or a haul-off speed of the plastic product 1.

The device 13 furthermore comprises an output device 37 coupled to the computing device 36. The output device 37 may, for example, be a warning lamp, a display, a screen, or even a data carrier. The output device 37 may be part of the computing device 36.

Figure 7:
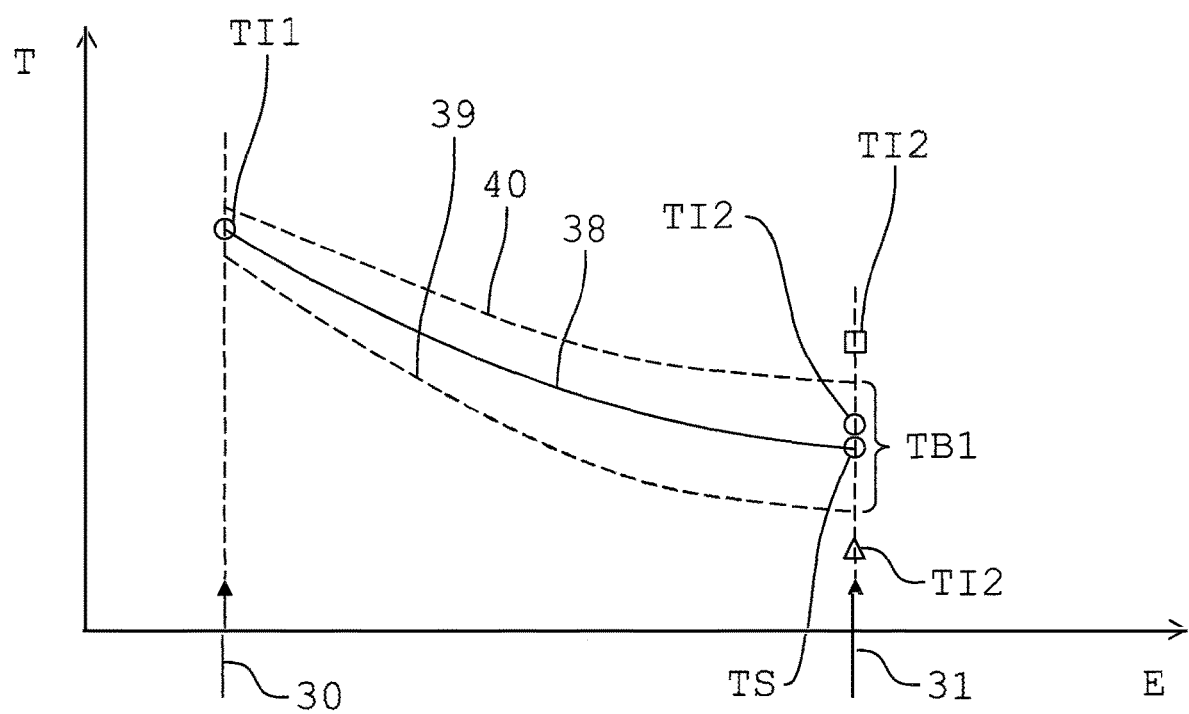
FIG. 7 shows a schematic view of an embodiment of a cooling curve of the plastic product according to FIG. 1.

In order to calculate the setpoint temperature TS, a fading curve or cooling curve 38, shown schematically in FIG. 7, of the plastic product 1 can, for example, be used. In the schematic illustration of the cooling curve 38 according to FIG. 7, the direction of extrusion E is plotted in a horizontal direction or x direction and the temperature T is plotted in a vertical direction or y direction. FIG. 7 furthermore shows a lower or first tolerance curve 39 and an upper or second tolerance curve 40. The tolerance curves 39, 40 define a tolerance range TB1 of the setpoint temperature TS, in particular at the second measuring point 31.

The tolerance curves 39, 40 may approximate the cooling curve 38 starting from the second measuring point 31 in the direction of the first measuring point 30, i.e., opposite the direction of extrusion E. In the reverse, this means that as viewed in the direction of extrusion E, the tolerance curves 39, 40 continuously move away from the cooling curve 38. Thus, the tolerance range TB1 may also change in the direction of extrusion E. The cooling curve 38 may be calculated based on the first actual temperature TI1. Alternatively, the cooling curve 38 may be determined or ascertained based on a production trial as already mentioned above with respect to the setpoint temperature TS.

Figure 8:
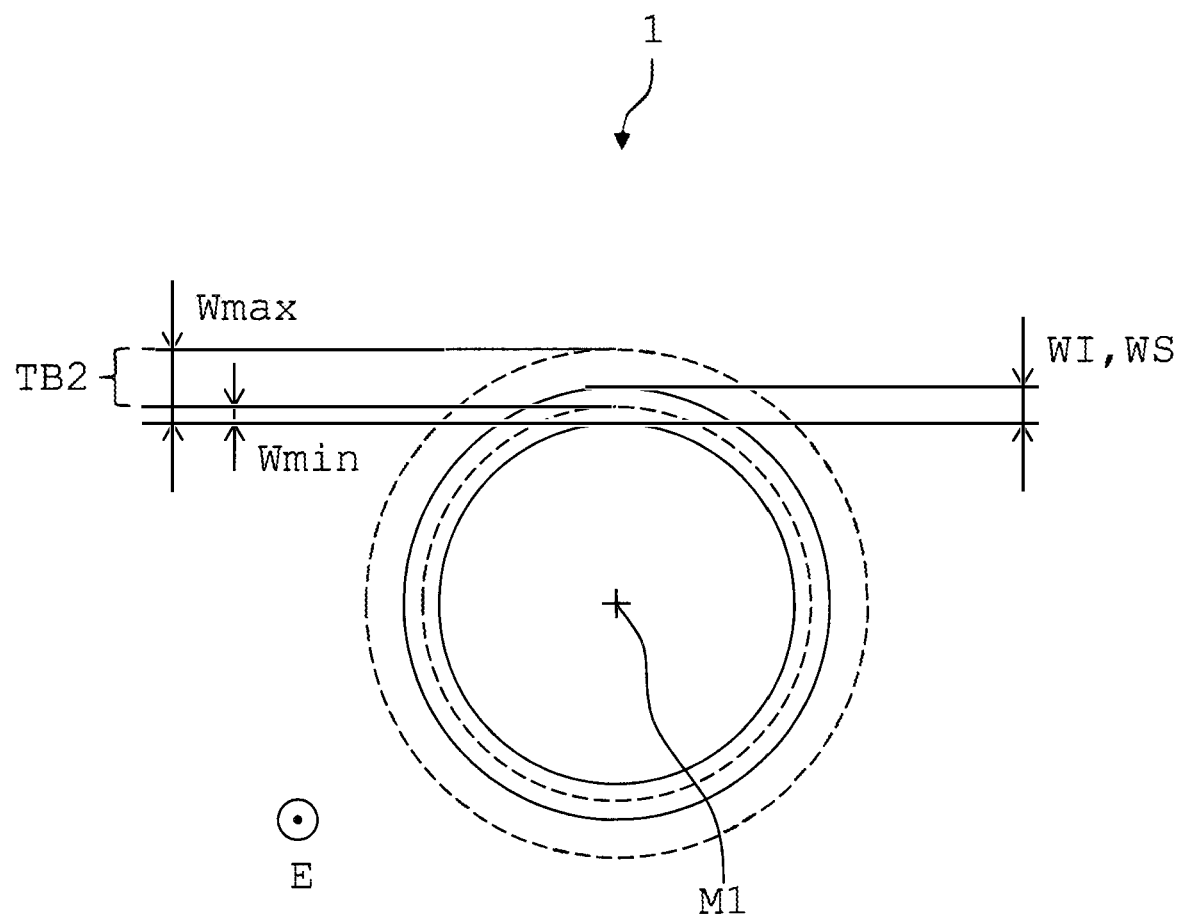
FIG. 8 shows another schematic sectional view of the plastic product according to FIG. 1.

FIG. 8 shows another schematic sectional view of the plastic product 1. After the corrugator 12, an actual wall thickness WI of the wall 2 of the plastic product 1 ideally corresponds to a nominal wall thickness WS of the same. Like for the setpoint temperature TS, a tolerance range TB2 which is ideally neither exceeded nor fallen below by the actual wall thickness WI may be prescribed for the nominal wall thickness WS. The actual wall thickness WI may in this case represent each of the wall thicknesses W3 to W6. The tolerance range TB2 of the nominal wall thickness WS in this case results from a minimum permissible wall thickness Wmin to be prescribed and a maximum permissible wall thickness Wmax to be prescribed.

Figure 9:
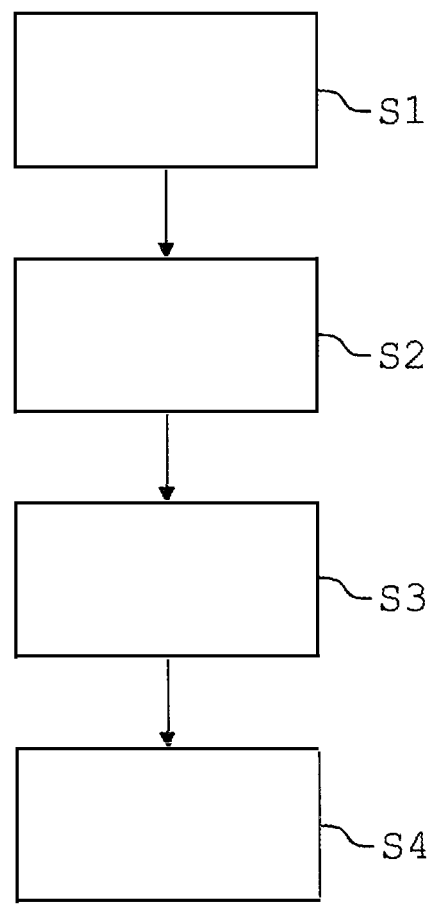
FIG. 9 shows a schematic block diagram of an embodiment of a method for the production control of the plastic product according to FIG. 1.

The functionality of the extrusion system 7 with the device 13 is explained below with reference to FIG. 7 and a method for the production control of the plastic product 1 shown schematically as block diagram in FIG. 9. The method comprises a step S1 of recording the first actual temperature TI1 of the first measuring areas 22 to 25 at the first measuring point 30. To this end, the first actual temperature TI1 is recorded by means of the recording device 21. The first actual temperature TI1 is shown as a circle in FIG. 7.

In a step S2, the second actual temperature TI2 of the measuring areas 22 to 25 at the second measuring point 31 is recorded by means of the recording device 21. For example, the second actual temperature TI2 as shown in FIG. 7 by means of a circle is not located on the cooling curve 38 but within the tolerance range TB1.

In a step S3, which may take place before, at the same time as or after the step S2, the setpoint temperature TS at the second measuring point 31 is determined. The determination may include calculating the setpoint temperature TS based on the first actual temperature TI1. The calculation takes place by means of the computing device 36. Determining the setpoint temperature TS may also take place by means of a production trial.

In a step S4, information on whether the second actual temperature TI2 is inside or outside the tolerance range TB1 of the setpoint temperature TS is output by means of the output device 37. As mentioned above, this information can, for example, be indicated as a notification on a display or screen. The information may also be supplied to a data carrier. The information may furthermore be passed to the control and/or regulating device 14 in order to control or readjust the extrusion system 7 in such a way that the second actual temperature TI2 is always within the prescribed tolerance range TB1.

In the case that the second actual temperature TI2 as shown in FIG. 7 by means of a rectangle is outside and above the tolerance range TB1, i.e., above the second tolerance curve 40, the output device 37 outputs the information that the actual wall thickness WI of the plastic product 1 exceeds the prescribed nominal wall thickness WS and in particular the tolerance range TB2. That is to say, if the second actual temperature TI2 is significantly above the calculated setpoint temperature TS at the second measuring point 31, it is to be assumed that a material accumulation that cools down more slowly than determined or calculated by means of the cooling curve 38 exists on the plastic product 1. The extrusion system 7 can then be readjusted by means of the control and/or regulating device 14 based on the information in such a way that the second actual temperature TI2 or the actual wall thickness WI is again within the tolerance range TB1 or the tolerance range TB2.

In the case that the second actual temperature TI2 as shown in FIG. 7 by means of a triangle is outside and below the tolerance range TB1, i.e., below the first tolerance curve 39, the output device 37 outputs the information that the actual wall thickness WI falls below the nominal wall thickness WS and in particular the tolerance range TB2. That is to say, if the second actual temperature TI2 at the second measuring point 31 is significantly below the determined or calculated setpoint temperature TS, it can be assumed that a material thinning exists, which leads to the plastic product 1 at the measuring areas 22 to 25 cooling down more quickly than determined or calculated by means of the cooling curve 38. The extrusion system 7 can then be readjusted by means of the control and/or regulating device 14 based on the information in such a way that the second actual temperature TI2 or the actual wall thickness WI is again within the tolerance range TB1 or the tolerance range TB2.

The device 13 and the method can also be used in the case of an extrusion system 7 without a corrugator 12, e.g., for the production control of a smooth tube or smooth pipe. By means of the device 13, a 100% quality control of the plastic product 1 in the operation of the extrusion system 7 is thus continuously possible. Time-consuming taking of samples of the plastic product 1 can be dispensed with. The operation of the extrusion system 7 can continue during the production control without interruption. Changes in the actual temperatures TI1, TI2 and in the actual wall thickness WI can be logged continuously.

Although the present invention was described based on exemplary embodiments, it can be modified in various ways.

LIST OF REFERENCE CHARACTERS

1 Plastic product
1' Blank
2 Wall
3 Wave valley
4 Wave crest
5 Flank
6 Flank
7 Extrusion system
8 Extruder
9 Melt pump
10 Melt flow
11 Die head
12 Corrugator
13 Device
14 Control and/or regulating device
15A Control element
15B Coupling element
16A Control element
16B Coupling element
17A Control element
17B Coupling element
18A Control element
18B Coupling element
19 Mandrel
20 Mouthpiece
21 Recording device
22 Measuring area
23 Measuring area
24 Measuring area
25 Measuring area
26 Recording element
27 Recording element
28 Recording element
29 Recording element
30 Measuring point
31 Measuring point
32 Recording element
33 Recording element
34 Recording element
35 Recording element
36 Computing unit
37 Output device
38 Cooling curve
39 Tolerance curve
40 Tolerance curve
a Distance
d3 Inner diameter
d4 Outer diameter
E Direction of extrusion
I Internal space
M1 Axis of symmetry
R Radial direction
S1 Step
S2 Step
S3 Step
S4 Step
TB1 Tolerance range
TB2 Tolerance range
TI1 Actual temperature
TI2 Actual temperature
TS Setpoint temperature
WI Actual wall thickness
Wmax Wall thickness
Wmin Wall thickness
WS Nominal wall thickness
W3 Wall thickness
W4 Wall thickness
W5 Wall thickness
W6 Wall thickness
x x direction
y y direction
α Angle of inclination

The invention claimed is:

1. A method for the production control of an extruded plastic product with the following steps:
recording at a first measuring point a first actual temperature of a measuring area provided on the plastic product,
recording a second actual temperature of the measuring area at a second measuring point which is arranged at a distance from the first measuring point in a direction of extrusion of the plastic product,
calculating a cooling curve of the plastic product based on material parameters of the plastic product or a production trial,
calculating a lower tolerance curve and an upper tolerance curve that approximate the cooling curve,
determining a setpoint temperature of the measuring area at the second measuring point, wherein the setpoint temperature is calculated based on the first actual temperature by means of the calculated cooling curve of the plastic product,
determining a prescribed tolerance range of the setpoint temperature based on the calculated lower and upper tolerance curves, and
outputting information on whether the second actual temperature is inside or outside the prescribed tolerance range of the setpoint temperature, wherein the lower and upper tolerance curves continuously move away from the cooling curve in the direction of the extrusion of the plastic product.

2. The method according to claim 1, wherein the first actual temperature is recorded at the first measuring point in the direction of extrusion after a corrugator of an extrusion system.

3. The method according to claim 1, wherein the first actual temperature and the second actual temperature are recorded by means of a recording device operating without contact.

4. The method according to claim 1, wherein a wall thickness of the plastic product is calculated by means of the first actual temperature and/or the second actual temperature.

5. The method according to claim 1, wherein information that an actual wall thickness of the plastic product at the measuring area exceeds a prescribed nominal wall thickness of the plastic product at the measuring area is output in the case that the second actual temperature is outside and above the tolerance range of the setpoint temperature.

6. The method according to claim 5, wherein information that the actual wall thickness at the measuring area falls below the prescribed nominal wall thickness at the measuring area is output in the case that the second actual temperature is outside and below the tolerance range of the setpoint temperature.

7. The method according to claim 6, wherein an extrusion system for extruding the plastic product is readjusted in such a way that the actual wall thickness at the measuring area is kept within a prescribed tolerance range of the nominal wall thickness.

8. The method according to claim 1, wherein the first actual temperature and/or the second actual temperature are recorded at several measuring areas provided on the plastic product, and wherein the measuring areas are arranged and distributed evenly around the plastic product.

\* \* \* \* \*